United States Patent [19]

Rymal, Jr.

[11] Patent Number: 5,147,534
[45] Date of Patent: Sep. 15, 1992

[54] WASTE WATER TREATMENT SYSTEM

[76] Inventor: Theodore R. Rymal, Jr., 7400 Jones Rd., Apt. 269, Galveston, Tex. 77551

[21] Appl. No.: 560,436

[22] Filed: Jul. 31, 1990

[51] Int. Cl.$^5$ .............................................. C02F 1/40
[52] U.S. Cl. .................................... 210/104; 210/115; 210/137; 210/181; 210/188; 210/195.1; 210/197; 210/221.2; 210/519; 210/521; 137/172
[58] Field of Search ................. 210/86, 104, 109, 181, 210/188, 195.1, 221.2, 257.1, 262, 521, DIG. 5, 115, 137, 197, 519; 55/166, 167, 185; 166/265, 267; 137/172

[56] References Cited

U.S. PATENT DOCUMENTS

| | | | |
|---|---|---|---|
| 1,159,044 | 11/1915 | Kelly, Jr. | 210/221.1 |
| 1,426,955 | 8/1922 | Carter | 210/188 |
| 2,047,989 | 7/1936 | Woelflin | 210/202 |
| 2,688,368 | 9/1954 | Rodgers et al. | 166/310 |
| 2,766,203 | 10/1956 | Brown et al. | 210/188 |
| 2,998,096 | 8/1961 | Snipes | 55/168 |
| 3,005,554 | 10/1961 | Kuntz | 210/96.1 |
| 3,396,846 | 8/1968 | Hamilton | 210/800 |
| 3,425,556 | 2/1969 | Volker | 210/104 |
| 3,764,008 | 10/1973 | Darley et al. | 210/709 |
| 3,884,803 | 5/1975 | Traylor | 210/712 |
| 4,018,683 | 4/1977 | Walters et al. | 210/142 |
| 4,045,344 | 8/1977 | Yokota | 210/106 |
| 4,123,357 | 10/1978 | Clements et al. | 210/71 |
| 4,145,280 | 3/1979 | Middelbeek et al. | 210/20 |
| 4,256,578 | 3/1981 | Kozar | 210/766 |
| 4,315,822 | 2/1982 | Jaisinghani | 210/115 |
| 4,356,086 | 10/1982 | Oberg | 210/115 |
| 4,492,630 | 1/1985 | Rymal, Jr. | 210/117 |
| 4,597,863 | 7/1986 | Rymal, Jr. | 210/117 |
| 4,732,682 | 3/1988 | Rymal | 210/620 |
| 4,990,237 | 2/1991 | Heuer et al. | 210/770 |
| 5,055,184 | 10/1991 | Carpenter et al. | 210/221.2 |

Primary Examiner—Peter Hruskoci
Assistant Examiner—Robert J. Popovics
Attorney, Agent, or Firm—Bushman, Anderson & Brookhart Browning

[57] ABSTRACT

Improved techniques are provided for separating mixtures of materials having different densities. The apparatus of the present invention is well suited for separating oil from water, and includes a separation tank defining a cylindrical water storage chamber and a frustroconical separation chamber spaced above an adjoining the water storage chamber. Fluid is input to the separation tank at the level of the oil/water interface. An oil leg is spaced above the separation chamber, and an adjustable oil overflow unit is provided adjacent the oil outlet for selectively varying the head pressure of oil in the oil leg. A water leg is provided in parallel with the separation tank, and an adjustable water overflow unit is provided adjacent the water outlet for selectively varying the head pressure of water in the water leg. The adjustable overflow units allow the head pressure in the oil leg relative to the head pressure in the water leg to maintain the interface within the upper portion of the separation chamber. Sensing means are provided for monitoring the elevation of the oil/water interface within the separation chamber.

20 Claims, 3 Drawing Sheets

WASTE WATER TREATMENT SYSTEM

BACKGROUND OF THE INVENTION

1. Field of the Invention

The present invention relates to methods and apparatus for separating materials of differing densities and, more particularly, relates to an improved system for efficiently removing oil or other hydrocarbons from waste water.

2. Description of the Background

Numerous devices have been constructed to remove oil or other contaminants from water. Most of these systems rely upon the difference in density between various liquids, and are thus theoritically capable of separating various solids and/or liquids from a different liquid. Since oil has a typical density of 0.346 lbs./per foot (columnar weight), and water has a density of 0.435 lbs./per foot, oil can be skimmed from the surface of water in a settling pond, while water flows under a weir to a discharge stream.

Various factors affect the manner in which petrochemical companies, manufacturing plants, municipal water departments, etc. are and will be handling the removal of oil from waste water. The quantity of water requiring removal of contaminants is tremendous, and billions of dollars are being expended annually to update existing waste water separation systems. Proponents often overrate the water flow volume which a particular separation system can efficiently handle, and users are justifiably skeptical of unproven claims. Environmentalists and government experts recognize that future regulations will control evaporation of hydrocarbons by requiring that settling tanks and ponds be enclosed, thereby substantially increasing the cost of those systems. While some experts tout biodegradation systems with "oil-eating bugs" as the key to future techniques for treating waste water, users recognize that such systems are both expensive and complicate downstream purification or separation systems.

U.S. Pat. No. 4,045,344 discloses a system for treating waste water including a bundle of submerged tubes with intermediate passageways. Organic substances are removed by decomposition caused by microorganisms or "bugs" which adhere to the tubes. U.S. Pat. No. 4,123,357 assigned to Chevron discloses a system for removing oil and deoiled solids from a sludge utilizing a combination of steps involving stirring, heating with a substantial input of mechanical energy, and sedimentation. U.S. Pat. No. 4,145,280 discloses a system for separating oil and water by passing the mixture first through a moving filter media, separating the coalesced substance by gravity, and filtering the remainder of the impurities from water. U.S. Pat. No. 4,356,086 discloses a vessel which floats on the surface of a body of water. Pumps are provided in the end of downwardly projecting tubes for pumping water in and out of the vessel. Oil is collected from the vessel, and may be subsequently pumped into a storage tanker.

U.S. Pat. No. 4,492,630 discloses a separator with a pair of tanks for separating hydrocarbons and water. The oil/water mixture is fed into the first tank, and water passes through a passageway connecting the first and second tanks. Oil is removed from the top portion of the second tank while water flows to an outlet provided in the bottom portion of the second tank. U.S. Pat. No. 4,597,863 utilizes many of the concepts disclosed in the '630 patent, and discloses a boat-like device for selectively propelling about the surface of a body of water to remove oil from the surface of the water.

One of the most commercially used oil/water separation systems is referred to as a "API" or "gun-barrel" system, which includes above-ground tanks typically each 50 to 100 feet in length. The oil/water mixture is continually input at one end of each tank, which is preferably sized to maintain a flow rate of about one knot. Oil is removed from the surface of the water at the other end of the tank, while water flows by gravity through a lower outlet to a discharge stream. The oil is commonly removed by a half-pipe located at the surface of the outlet end of the tank, and a "paddle wheel" mechanism may be provided to mechanically push the oil toward its collection site.

The gun-barrel separator has long experienced numerous problems. Oil tends to "weather" due to naturally occuring biodegradation and forms a basic-sediment-and-water layer, which is an emulsified water mixture commonly referred to as "BS & G layer" or "rag layer". This rag layer is highly elastic, and tends to form "clumps" which detract from the efficient separation of oil from the water. The paddle wheel tends to further emulsify the oil and contribute to the formation of a rag layer. Light oil with a density less than the rag layer cannot penetrate through the rag layer to the surface. The water tends to "channel" to the surface at the collection site, since the elastic rag layer resists uniform flow and "backs up" to the half-pipe. Consequently, water rather than oil is commonly recovered from the surface of the tank, and a high concentration of a entrained oil droplets flow with the water to the downstream system.

The disadvantages of the prior art are overcome by the present invention, and a relatively inexpensive and highly efficient system is hereinafter disclosed for separating a mixture of different density materials. The concepts of the present invention are particularly well suited for removing oil and other hydrocarbons from waste water.

SUMMARY OF THE INVENTION

While the system according to the present invention may be used to separate various mixtures of different density liquids or solid/liquid mixtures, the invention will be particularly described for recovering oil and similar hydrocarbons from water. The system includes either a single stage or a first and second stage collector, depending on the extent of degradation the oil has undergone prior to entering the system. Preferably the oil is not partially decomposed, in which case the single stage unit may be used. The two stage separator technique is required for separating a mixture comprising water, oil, and a partially decomposed oil/water mixture or "rag layer", and is the system which is commonly required if upstream sedimentation ponds or gun barrel separators are used.

In one embodiment, a steam striping technique is first used to remove highly volatile hydrocarbons, such as benzene, from the waste water. Sedimentation can then be removed in a sludge settlement tank, and some water may subsequently be removed utilizing a gun barrel separator, then biologically treated prior to discharge. The skimmed oil/water mixture from the gun barrel separator may be input to the first stage unit, where air is added to float the partially decomposed oil/water mixture, and clean water is removed from the bottom of the first stage collector. The oil and rag layer mixture from the first stage unit are input to the second stage unit, where heat and chemical additives break down the rag layer into oil, water and sludge. Oil is then removed from the second stage unit, while removed water may optionally be retreated. The first and second stage units are highly efficient at recovering oil from waste water, may be fabricated and operated at a relatively low cost, and may be easily encapsulated to avoid evaporation of hydrocarbons.

Both the first and second stage units employ an oil leg and a water leg, with the height of each leg being selectively controllable to maintain the oil/water (or rag layer/water and oil/rag layer) interface at desired levels within the units. Waste water to the first unit is input at the oil/water interface, which is preferably located within the upper portion of a conical section spaced between the water tank and the oil leg. The diameter of the oil leg is controlled to maintain a constant and steady flow of oil through the oil leg, and air is added to reduce the density of the partially decomposed oil/water mixture, thus allowing this mixture to flow with the oil over the oil leg. Water is continually removed from an outlet in the bottom of the first unit, then up the water leg and over its adjustable weir. The fluid from the oil leg in the first unit is input to the second unit at the rag layer/water interface. The mixture in a lower portion of the rag layer in the second unit is removed, heated and optionally treated chemically to break down the mixture into oil, water, and sludge, and then input at the oil/rag layer interface in the second unit. Recoverable oil is collected from the oil leg of the second unit, while water from this unit may be retreated.

It is an object of the present invention to provide a relatively low cost, highly efficient system suitable for removing oil from waste water.

It is a further object of this invention to provide an improved separation technique which is capable of handling large volumes of water while outputting water much cleaner than prior art systems.

It is a feature of the present invention that the system may separate oil from water, and may also separate both oil and partially decomposed oil from waste water.

It is a significant feature of this invention that the separation units may be enclosed to control evaporation of hydrocarbons.

It is an advantage of the present system that a relatively small space is required to reliably separate large volumes of an oil/water mixture.

It is another advantage of the system according to the present invention that it may easily adjusted to accommodate density changes in one of the materials to be separated.

It is a further advantage of this invention that both the first and second stage collection units may be formed from cylindrical-shaped tanks, thereby substantially reducing manufacturing costs.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
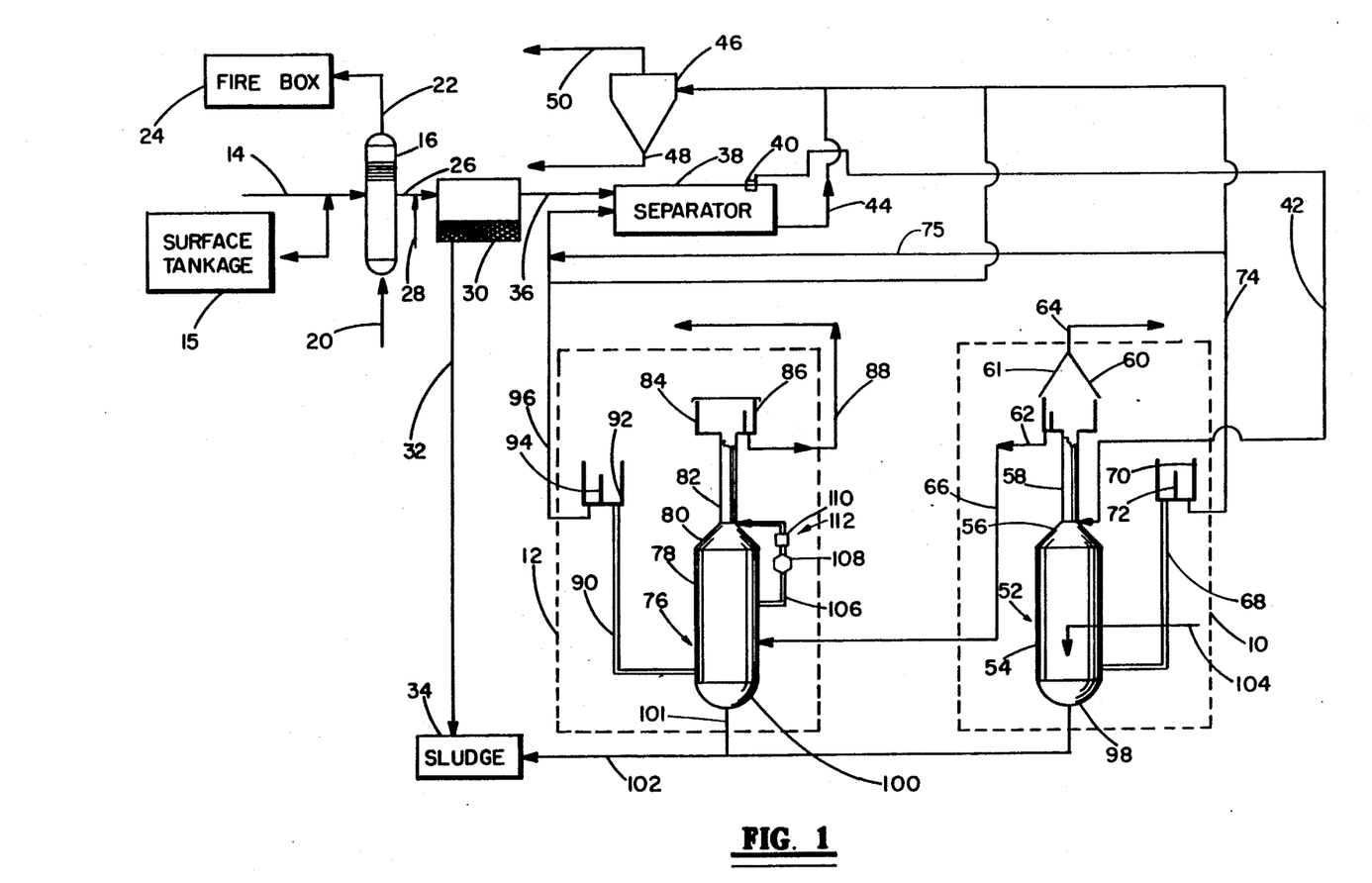
FIG. 1 is a simplistic schematic representation of one type of waste water treatment system including first and second stage collectors according to the present invention.

FIG. 1 generally depicts a system for purifying waste water in accordance with the present invention. Waste water from an industrial complex, petrochemical facility, manufacturing plant, etc. typically may contain water, various hydrocarbons, such as oil, and often more volatile fluids, such as benzene. Waste water flows continually to the separation and treatment facilities through flow line 14. A surge tank 15 may optionally be provided for temporarily storing high flow volumes, and the volume of stored fluids may be released during periods of low flow volumes.

A conventional steam stripper unit 16 may be used to remove the more volatile liquids, such as benzene, which are in a relatively high concentration of greater than about 1 ppm. The temperature in the stripper 16 is maintained by regulating the steam input through line 20, and removed benzene flows by a line 22 to a fire box 24 for disposal. Water and hydrocarbons flow from the stripper 16 via line 26 and, if desired, waste water including hydrocarbons and a relatively low concentration of benzene, e.g., less than about 0.5 ppm, may be input via line 28 to the line 26, then input to a conventional sludge removal tank 30. Large sedimentation is removed from tank 30 via line 32 through sludge disposal unit 34, while waste water and hydrocarbons flow via line 36 to an API or "gun barrel" separator 38.

Fluid input to the conventional separator 38 flows along the length of the separator, allowing some hydrocarbons to float the surface. Ideally, oil and other hydrocarbons are recovered by the half-pipe 40, while water flows through the bottom of the separator 38 via line 44 to a biological treatment unit 46. Water from unit 46 is ideally sufficiently clean to flow via line 50 to a public or municipal water system (not shown), while sludge is removed by line 48, and may optionally be input to disposal unit 34.

In practice, the use of an API separator 38 complicates efficient removal of hydrocarbons and, as previously explained, preferably is not utilized. Water and hydrocarbons preferably flow directly from line 26, or optionally from a covered sludge removal tank 30, directly to the first stage separator unit 10. In this case, a second stage separator unit 12 may not be required, since the single stage unit 10 efficiently separates oil from water, with oil flowing via line 64 to a covered oil recovery tank, while water flows via line 66 to a municipal water system, and sludge flows via line 102 to unit 34.

If an API separator is used, those skilled in the art appreciate that oil, water, and an BS&G layer typically flow from half pipe 40 through line 42. This mixture is input to the first stage separator 10. Also, the quantity of oil in line 44 may require that the "water" from the separator 38 also flow to the separator unit 10, which further illustrates the inefficiency of the separator 38.

The first stage separator unit 10 comprises a separator tank 52, an oil leg 58, and a water leg 68. The separation tank has an oil/water interface, as explained below, and includes a cylindrical water storage chamber 54 and a frustroconical separation chamber 56 adjoining the water storage chamber. Since the separation chamber is frustroconical, it has a horizontal cross-sectional area which continually decreases with increased spacing from the water storage chamber. The oil leg is merely a riser or pipe having a uniform diameter, with a lower oil inlet adjacent the top of the separation chamber, and an upper oil outlet. An adjustable oil overflow unit 60 is provided adjacent the oil outlet to selectively vary the head pressure of oil in the oil leg. The water leg 68 is in parallel with the separation tank, and has an inlet in fluid communication with a lower portion of the cylindrical water storage chamber, and an outlet spaced vertically between the oil/water interface and the oil outlet. An adjustable water overflow unit 70 provided adjacent the water outlet for selectively varying the head pressure of water in the water leg.

Assuming a separator 38 is used (or if a BS&G layer is otherwise present in the oil/water mixture), the fluid to be separated is passed first through the separator 10 then through the separator 12. Water in the line 42 flows into the separation tank at the elevation of the oil/water interface, which preferably is maintained in the upper portion of the frustroconical separation chamber 56. Oil flows through the oil leg 58 and over the adjustable oil overflow unit 60, then via line 66 to the second stage unit 12. The entirety of the oil leg and the adjustable oil overflow unit is preferrably enclosed by a conventional covering 61, and fumes from the oil overflow unit are drawn through line 64 and may then be flared or otherwise disposed of. Water from the water overflow unit 70 flows via line 74 to the biological treatment unit 46, or optionally may flow via line 75 and be input back to the separator 38 for further treatment. A selected gas, such as air, is added to a lower portion of the water storage tank via line 104, and acts to assist in floating the BS&G layer, so that this layer passes with the oil (and perhaps some water) out the line 66.

Fluid which overflows the oil overflow unit of the first stage separator thus is input to the second stage unit 12 via line 66. Unit 12 is structurally similar to unit 10, and includes a second separation tank housing a lower rag layer/water interface and an upper oil/rag layer interface, as explained subsequently. The second separation tank includes a cylindrical-shaped rag layer storage chamber 78 and a second frustroconical separation chamber 80 spaced above and adjoining the rag layer storage chamber. Water flows out the lower portion of the second cylindrical shaped chamber via line 90, and flows over a second adjustable water overflow unit 92 to either separator 38 or (preferably) the biological treatment unit 46. Oil flows over the second oil overflow unit 84, and through line 88 to a suitable covered oil storage tank (not shown). Water and BS&G from a lower portion of the cylindrical chamber 78 are removed via line 106, and flow through a heater 108 and to a mixer 110, where chemicals are optionally added. The treated fluid is then input into an upper portion of the second frustroconical separation chamber 80.

Figure 2:
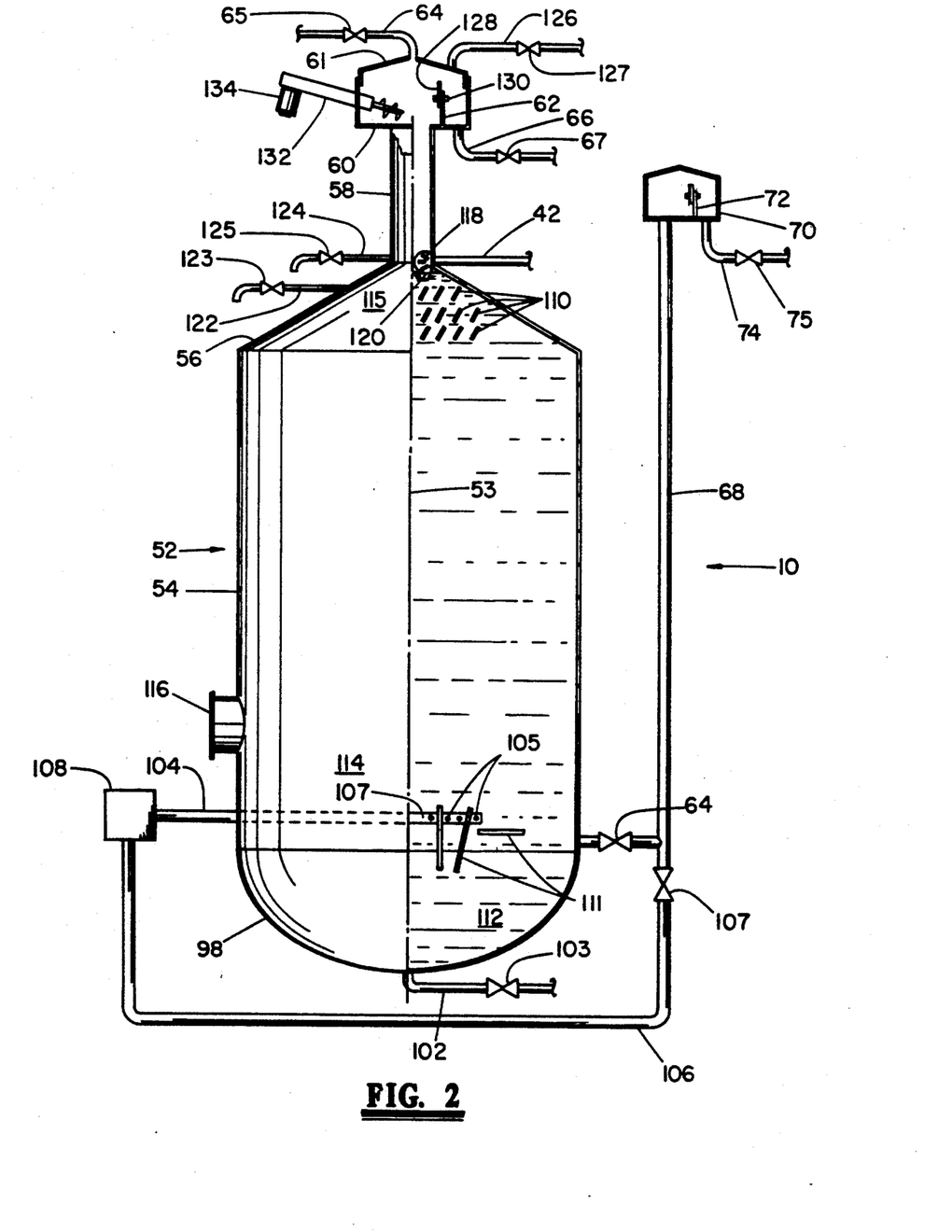
FIG. 2 is a more detailed pictorial and cross-sectional view of the first stage collector generally shown in FIG. 1.

Referring now to FIG. 2, the first stage separator unit 10 is shown in greater detail. The tank 52 includes a portion 54 defining a cylindrical-shaped water storage chamber 114, and a frustroconical portion 56 defining a similarly-shaped separation chamber 115. A manhole access 116 is provided in the side of the portion 54. A lower bowl-shaped portion 98 defines a sludge storage chamber 112 for periodically removing accumulated sludge through line 102 by opening valve 103. The tank 52 has a central axis 53, and each of the chambers 115, 114 and 112 are preferably axially aligned, with the chambers being vertically positioned as shown in FIG. 2. A suitable base support (not shown) is conventionally provided for affixing to the portion 54 or the bowl-shaped portion 98.

The oil/water interface 120 is preferably maintained within an upper portion of the chamber 115. The fluid inlet 42 is provided at approximately the level, and ideally at the level, of the interface 120, and is spaced vertically a distance of 6" or less from the oil/water interface. Fluid is preferrably input tangentially to the chamber 115, and may pass through a defusion head 118. A pair of vertically spaced taps 122 and 124 may be provided respectively above and below the ideal location of the oil/water interface. The corresponding valves 123, 125 may be intermittently open to sample fluid at the level of each tap. Ideally, the interface 120 is maintained so that substantially only oil will flow through the tap 124, and essentially only water is removed from tap 124. If the taps indicate that the oil/water interface has risen or fallen from its desired level, the interface may be adjusted, as explained subsequently. A plurality of coalescing plates 110 are provided within the chamber 115, while diffusion baffles 111 are mounted within the lowermost portion of the water storage chamber 114. The plates 110 and baffles 111 may or may not be beneficial to the separation technique and normally will be used only when a single stage generator is used on a mechanical rather than a chemical emulsion.

Oil flows up the leg 58 to the adjustable oil overflow unit 60, which preferably including cover 61. Valve 65 is normally open, so that hydrocarbons are not released to the environment, but rather pass through line 64 and are flared or otherwise disposed of or collected. If desired, the safety of the unit may be enhanced by opening valve 127 to add nitrogen via line 126 to the interior of the adjustable oil overflow unit 60.

Oil flows through the leg 58 and over weir 62, with the upper portion 128 of the weir being vertically adjustable by bolt and nut assemblies 130. The head pressure of oil in the leg 58 may thus be controlled by regulating the height of the adjustable weir 62. Oil overflowing weir 62 passes by line 66 through normally open valve 67 to an oil recovery tank (not shown) if the fluid input to the unit 10 does not include a BS&G layer. If such a layer is present, oil and the BS&G layer material flow to a second stage collector 12 as previously noted. It should be noted that a BS&G layer will normally be present if the oil and hydrocarbon mixture is allowed to contact air or water for a substantial period of time, such as is the case if a gun barrel or API separator 38 is used in the process. If a BS&G layer is not present, oil with a low concentration of water is collected through line 66, and the collected oil may be filtered and refined by conventional techniques, then reused in manufacturing processes.

Water flows out the lower portion of the storage chamber 114, then through normally open valve 64 and up the water leg 68, which has a uniform cross-sectional flow area and is in parallel with the tank 52. Conveniently the water leg 68 is provided outside the tank 52, although the water leg could be located within the tank 52 and rise through the top of the conical portion 56, if desired. Water flows through leg 68 to the adjustable water overflow unit 70, which includes an adjustable weir 72 which is structurally and operationally similar to weir 62. Water overflowing the weir 72 passes through valve 75 and may flow via line 74 to a separator unit for further recycling, or preferably either to unit 46 or to a municipal water system.

If the input mixture includes a BS&G layer, a selected gas is preferably input to a lower portion of the water storage chamber 114 so that gas molecules attach themselves to the BS&G material and float this layer to the top of the separation chamber 115, where it flows through the oil leg 58 and over the weir 62. Water super saturated with air from aerator unit 108 is input via line 104 into the lower portion of the chamber 114, and flows out a plurality of ports 105 in the input line 107. The super saturated water does not simply "bubble" to the surface, but rather attaches itself to the BS&G material to cause this material to rise and flow out the oil leg. Although various aerator devices may be used, a preferred unit 108 is of the type available from Poscon, Inc. in Conroe, Tex. and is functionally similar to the unit disclosed in U.S. Pat. No. 4,732,682.

Figure 3:
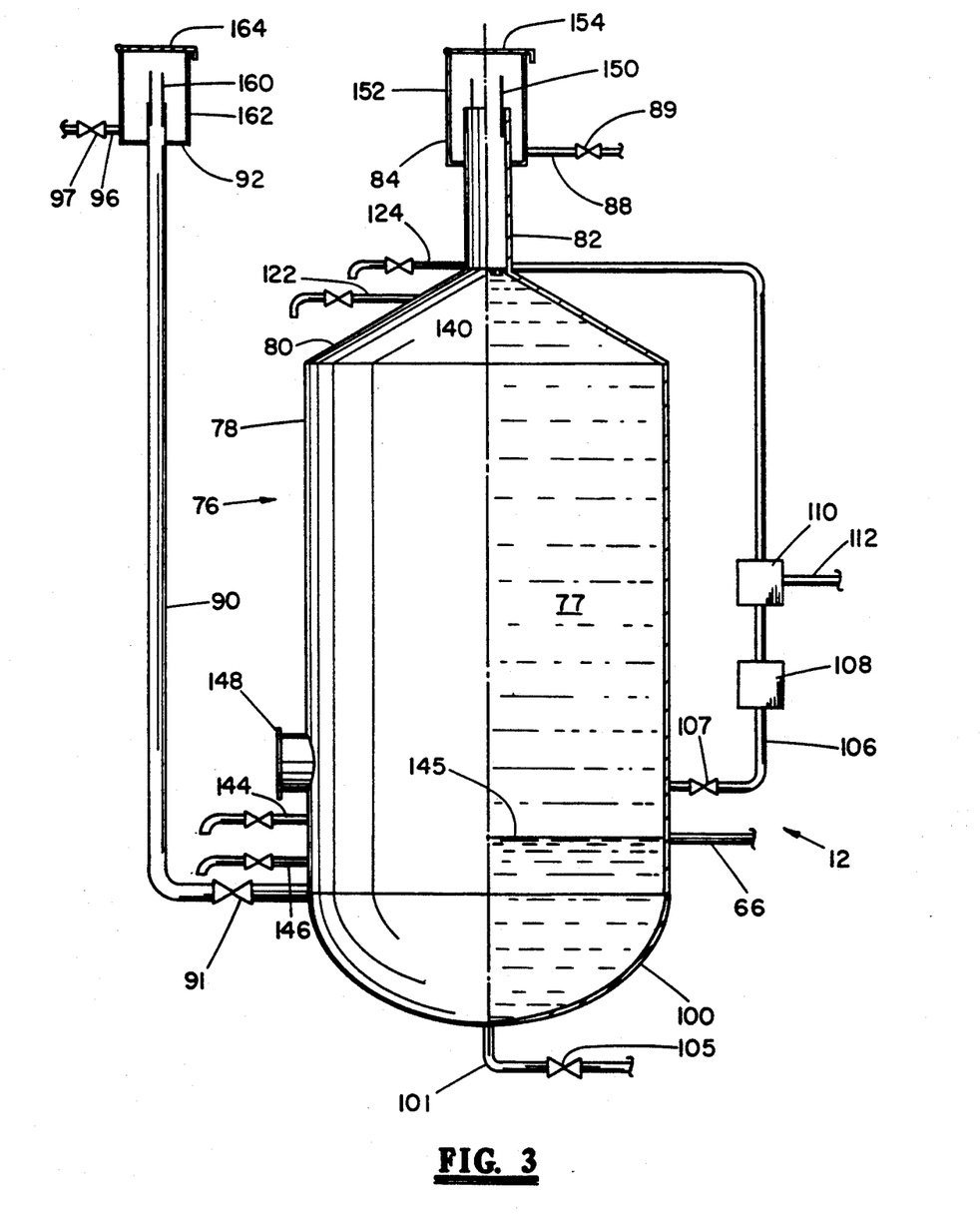
FIG. 3 is a more detailed pictorial and cross-sectional view of the second stage collector generally shown in FIG. 1.

FIG. 3 depicts a second stage separator unit 12 which is used if the fluid input to the unit 10 includes BS&G material. The second tank 76 includes a cylindrical portion 78 defining a rag layer storage chamber, a second frustroconical portion 80 defining a separation chamber, and a lower portion 100 for sludge removal. Access 148, line 101, valve 105, oil leg 82, water leg 90, and valve 91 are functionally similar to components 116, 102, 103, 58, 68 and 64, respectively, as previously described. Taps 122 and 124 are provided for monitoring the elevation of the rag layer/oil interface 140, which preferably is maintained within the upper portion of the separation chamber.

The water/oil mixture is input via line 66 to the second tank 76, preferably at the elevation of the water/rag layer interface 145. While it is not critical that the input line be exactly at the interface 145, interface 145 is preferably maintained within at least 2 feet, and preferably less than 1 foot, from the level of the input line 66 to the tank 76. Rag layer material is withdrawn continuously from the lower portion of the rag layer storage chamber 77 (preferably above the elevation of the interface 145), with the quantity of withdrawn fluid being controlled by valve 107. Rag layer material flows through line 106 to a heater unit 108 to which heat this mixture to a temperature of from 160° F. to 220° F., which breaks the mixture down to oil, solid particles, air and water. Preferably, the mixture is also passed through a mixing unit 110, where a selected chemical or a pH adjustment or other commercially available deimmulsifier is added through line 112.

Oil flows continually up oil leg 82 to the adjustable oil overflow unit 84. Unit 84 includes a short section of pipe 150 which is slightly smaller than and extends adjustably upward from the leg 84, thereby serving as an overflow or weir. The overflow housing 152 is provided with a lid 154 to prevent the escape of gases. Oil flows over 150 and past valve 89 to a covered collection tank (not shown). The oil recovered from the unit 12 may be filtered, purified by conventional techniques, and reused. Water flows up leg 90 to the adjustable water overflow unit 92, which includes a similar adjustable pipe 160. The water housing 162 may also include a cover 164, and water overflowing 160 flows through valve 97 and out line 96. Water from unit 12 is sufficiently clean to the input directly to a municipal water system, or optionally may flow to a treatment unit 46. The type of overflow units depicted in FIG. 3 are interchangeable with the overflow units depicted in FIG. 2, and either the first or second unit may have other types of overflow units.

According to the method of the present invention, each of the separation chambers for the first or second stage unit has a lowermost cross-sectional area approximating the area adjoining the cylindrical storage chamber. This cross-sectional area continually decreases with increased spacing from the storage chamber, and the size of the oil leg as explained subsequently substantially minimizes or eliminates "channelling" of water up the oil leg, so that substantially only oil (or oil and rag layer material for unit 10) overflows from the oil leg. The head pressure of oil in the oil leg and the head pressure of water in the water leg are each independently adjustable, and the location of the interfaces are maintained at their desired level by changing the head pressures.

The oil/water interface may be maintained at its desired level by controlling the head pressures in the oil leg 58 and the water leg 68, and both the oil/rag layer and rag layer/water interfaces may be maintained at their desired levels in the unit 12. For example, if tap 122 in unit 10 is checked and oil is recovered, the oil/water interface has likely dropped. By raising the adjustable weir 72, the oil/water interface 120 in unit 10 may be raised to its desired level. Similarly, if the oil/rag layer interface 140 in unit 12 is at its desired level but the water/rag layer interface 145 is raised so that water comes out the tap 144, both the oil overflow unit and the water overflow unit may be simultaneously adjusted to maintain the oil/rag layer interface at its previous level while lowering the rag layer/oil interface to its desired level. Those skilled in the art should now appreciate that the level of each of the interfaces discussed above may be carefully controlled by adjusting the head pressure in the oil leg and the head pressure in the water leg, and that these adjustments may be made in response to the fluid sampled from each of the taps.

As previously noted, each oil leg has a substantially uniform cross-sectional area, so that no "dead areas" are in the oil leg. Oil continually moves at a substantially uniform velocity up the oil leg, thus eliminating premature biodegradation.

The desired diameter of the oil leg will depend on the anticipated quantity of oil which will be separated from water, although a diameter of at least 4" is generally preferred for the oil leg. The desired cross-sectional area of the oil leg will also be a function of the density and viscosity of the recovered oil, since the oil must be able to flow up the oil leg without allowing water to channel past the oil to the top of the oil leg. Preferably the cross-sectional area of the oil leg is sized so that oil moves upward through the oil leg at a rate of at least 4 feet per minute. The vertical height of the oil leg will vary with the height of the water leg, since the head pressure in each of these legs must be balanced to maintain the interface at its desired location. Preferably, however, the volume of the oil leg is maintained at a level of less than or equal to 180 times the anticipated flow rate of oil through the oil leg. Accordingly, if an oil recovery rate of 0.5 cubic feet per minute is anticipated, the volume of the oil leg will be less than or equal to 90 cubic feet. A relatively low volume for the oil leg is preferred in order to minimize biodegradation of oil in the oil leg. The addition of nitrogen to the oil overflow unit and the utilization of nitrogen rather than air as the selected gas added to the lower portion of the water storage chamber of the unit 10 will decrease the biodegradation of oil within the unit 10.

The water storage chamber for the unit 10 and the corresponding rag layer storage chamber for the unit 12 are each preferably cylindrical-shaped chambers, and are sized so that the fluid in these chambers maintains a substantially uniform downward velocity of less than about 45 feet per minute. This relatively slow velocity of water in the water storage chamber and of the rag layer material in the rag layer storage chamber provides sufficient time for the separation of materials, and also allows the gas added to the unit 10 to become attached to the rag layer to float the rag layer to the top of the separation chamber and out the oil leg.

Although the invention has been described in detail with respect to separating oil or a similar hydrocarbon from water, it should be understood that the concepts of the present invention may be used to separate various dissimilar fluids, and in a broad sense the water and oil may be considered first and second materials which are separated by the techniques of the present invention. Accordingly, the apparatus and methods described herein may be used for separating oil from water at a well head, and may also be used to separate oils or other hydrocarbons having different densities.

It should also be understood that the techniques of the present invention may be used to separate solid materials from a fluid having a density different than the solid materials. For example, plastic having a density of less than water may be separated from water using the techniques of the present invention. In this case, the adjustable overflow units as discussed above may not be desireable, and instead an auger 132 powered by a drive motor 134 may be used to draw the separated plastic pellets from the top of the leg 58, which in this case would be a plastic pellet leg rather than an oil leg. Again, the level of pellets within the adjustable overflow unit may be regulated by changing the elevation of the entrance for the auger to maintain the pellets/water interface at its desired location within the upper portion of the separation chamber.

Although each of the seperation tanks for the units 10 and 12 preferably include a cylindrical portion and a conical portion, as discussed above, it should be understood that either configurations are possible, but are not preferred since they will generally increase the cost for manufacturing the units. For example, the water storage chamber for the unit 10 may be fabricated to have a rectangular cross-sectional configuration, although additional reinforcing members may be required to prevent bursting of the water storage tank. In this case, the separation chamber will likely not be conical-shaped, but rather likely have the configuration of a pyramid, with the base of the pyramid corresponding to the upper portion of the water storage chamber. Even in this latter case, however, the cross-sectional area of the separation chamber continually decreases with increased spacing from the water storage chamber to maximize the efficiency of the separation process.

Those skilled in the art will also appreciate that various mechanisms other than outlet taps may be used to monitor the elevation of each of the interfaces. While sophisticated electronic interface monitoring units and/or transparent port holes may be used to monitor the level of the interfaces, each of these monitoring techniques substantially increases the cost of the units without adding significantly to the capabilities of the apparatus. It should be understood, however, that such conventional interface monitoring mechanisms may be used and are within the scope of this invention.

The foregoing disclosure and description of the invention are thus illustrative and explanatory of the apparatus and techniques of the present invention, and various changes in the size and shape of the units, as well as the details of the construction, may be made within the scope of the appended claims and without departing from the spirit of the invention.

What is claimed is:

1. Apparatus for separating a mixture of oil and water, comprising:
    a separation tank including a water storage chamber and a separation chamber spaced above and adjoining the water storage chamber, the separation chamber having a horizontal cross-sectional area which continually decreases with increased spacing from the water storage chamber for housing an oil/water interface;
    a fluid inlet to the separation tank for continually discharging the mixture of oil and water into the separation chamber;
    an oil leg flow line spaced above the separation chamber, the oil leg flow line having a substantially uniform cross-sectional flow area, an oil inlet adjoining the separation chamber, and an oil outlet above the oil inlet;
    an adjustable oil overflow unit means adjacent the oil outlet for selectively varying the elevation of the water outlet with respect to the separation tank and thereby the head pressure of oil in the oil leg flow line;
    a water leg flow line spaced in parallel with the separation tank, the water leg flow line having a water inlet in fluid communication with a lower portion of the water storage chamber and a water outlet spaced vertically between the water storage chamber within the separation tank and the oil outlet;
    an adjustable water overflow unit means adjacent the water outlet for selectively varying the elevation of the water outlet with respect to the separation tank and thereby the head pressure of water in the water leg flow line;
    the adjustable oil overflow unit means and the adjustable water overflow unit means creating a head pressure in the oil leg flow line relative to the head pressure in the water leg flow line to maintain the oil/water interface within the separation chamber; and
    sensing means for monitoring the elevation of the oil/water interface within the separation chamber.

2. The apparatus as defined in claim 1, wherein the water storage chamber has a substantially cylindrical configuration, and the separation chamber has a substantially frustroconical configuration.

3. The apparatus as defined in claim 1, further comprising:
    aeration means for inputting a selected gas to the water storage chamber.

4. The apparatus as defined in claim 1, wherein the sensing means comprises:
    first and second vertically spaced outlet taps each for selectively sampling the fluid adjacent an upper portion of the separation chamber at the elevation of the respective outlet tap.

5. The apparatus as defined in claim 1, further comprising:

a sludge removal chamber spaced below and adjoining the water storage chamber.

6. The apparatus as defined in claim 1, further comprising:
   a plurality of coalescing plates each positioned within the separation chamber; and
   a plurality of diffusion baffles each positioned within the water storage chamber.

7. The apparatus as defined in claim 1, further comprising:
   another separation tank for housing a lower rag layer/water interface and an upper oil/rag layer interface, the another separation tank including a rag layer storage chamber and an another separation chamber spaced above and adjoining the rag layer storage chamber, the another separation chamber having a horizontal cross-sectional area which continually decreases with increased spacing from the rag layer storage chamber;
   another oil leg flow line spaced above the another separation chamber, the another oil leg flow line having an another substantially uniform cross-sectional flow area, an another oil inlet adjoining the another separation chamber, and an another oil outlet above the oil inlet;
   another adjustable oil overflow unit means adjoining the another oil outlet for selectively varying the elevation of the another oil outlet with respect to the another separation tank and thereby the head pressure of oil in the another oil leg flow line;
   another water leg flow line spaced in parallel with the another separation tank, the another water leg flow line having an another water inlet in fluid communication with a lower portion of the rag layer storage chamber and an another fluid outlet spaced vertically between the rag layer storage chamber and the another oil outlet;
   another adjustable water overflow unit means adjoining the another water outlet to selectively vary the elevation of the another water outlet with respect to the another separation tank and thereby the head pressure of water in the another water leg flow line;
   a flow line between the oil outlet of the oil leg flow line and an another fluid inlet to the another separation tank;
   the another fluid inlet to the another separation tank continually inputting fluid from the oil outlet into a lower portion of the rag layer storage chamber; and
   another sensing means for monitoring the elevation of the oil/rag layer interface within the another separation chamber.

8. The apparatus as defined in claim 7, further comprising:
   a rag layer treating flow line having a fluid inlet from a lower portion of the rag layer storage chamber and a fluid outlet to an upper portion of the another separation chamber;
   heating means for heating the fluid passing through the rag layer treating flow line; and
   mixing means for intermixing a selected chemical with the fluid passing through the rag layer treating flow line.

9. The apparatus as defined in claim 1, wherein each of the adjustable oil overflow unit means and the adjustable water overflow unit means includes a weir adjustable with respect to the separation tank.

10. The apparatus as defined in claim 1, wherein the oil leg flow line has a diameter of at least 4 inches.

11. Apparatus for separating a mixture of first and second materials having different densities, the density of the first material being greater than the density of the second material, the apparatus comprising:
    a separation tank including a first material storage chamber and a separation chamber spaced above and adjoining the first material storage chamber, the separation chamber having a horizontal cross-sectional area which continually decreases with increased spacing from the first material storage chamber for housing a first material/second material interface;
    a fluid inlet to the separation tank for continually discharging the mixture of the first and second materials into the separation chamber;
    a second material leg flow line spaced above the separation chamber, the second material leg flow line having a substantially uniform cross-sectional flow area, a second material inlet adjoining the separation chamber, and a second material outlet above the second material inlet;
    an adjustable second material overflow unit means adjacent the second material outlet for selectively varying the elevation of the second material outlet with respect to the separation tank and thereby the head pressure of the second material in the second material leg flow line;
    a first material leg flow line spaced in parallel with the separation tank, the first material leg flow line having a first material inlet in fluid communication with a lower portion of the first material storage chamber and a first material outlet spaced vertically between the first material storage chamber within the separation tank and the second material outlet;
    an adjustable first material overflow unit means adjacent the first material outlet for selectively varying the elevation of the first material outlet with respect to the separation tank and thereby the head pressure of the first material in the first material leg flow line;
    the adjustable second material overflow unit means and the adjustable first material overflow unit means creating a head pressure in the second material leg flow line relative to the head pressure in the first material leg flow line to maintain the first material/second material interface within the separation chamber; and
    sensing means for monitoring the elevation of the first material/second material interface within the upper portion of the separation chamber.

12. The apparatus as defined in claim 11, further comprising:
    the first material storage chamber has a substantially cylindrical configuration; and
    the separation chamber has a substantially frustroconical configuration.

13. The apparatus as defined in claim 11, wherein each of the adjustable second material overflow unit means and the adjustable first material overflow unit means includes a weir adjustable with respect to the separation tank.

14. Apparatus for separating the mixture of first and second materials having different densities, the density of the first material being greater than the density of the second material, the apparatus comprising:

a separation tank including a first material storage chamber and a separation chamber spaced above the first material storage chamber, the separation chamber having a horizontal cross-sectional area which continually decreases with increased spacing from the first material storage chamber for housing a first material/second material interface;

a fluid inlet to the separation tank for continually inputting the mixture of first and second materials into the separation tank;

a second material leg flow line spaced above the separation chamber, the second material leg flow line having a second material inlet adjoining the separation chamber and a second material outlet above the second material inlet;

a second material overflow weir means adjacent the second material outlet;

a first material leg flow line spaced in parallel with the separation tank, the first material leg flow line having a first material inlet in fluid communication with the first material storage chamber and a first material outlet spaced vertically between the first material storage chamber and the second material outlet;

a first material overflow weir means adjacent the first material outlet;

the first material overflow weir means and the second material overflow weir means creating a head pressure in the first material leg flow line relative to the head pressure in the second material leg flow line to maintain the first material/second material interface within the separation chamber; and at least one of the first material overflow weir and the second material overflow weir being adjustable for selectively varying the elevation of the respective outlet with respect to the separation tank and thereby the head pressure of the material within the respective flow line.

15. The apparatus as defined in claim 14, further comprising:

sensing means for monitoring the elevation of the first material/second material interface within the separation chamber.

16. The apparatus as defined in claim 14, further comprising:

the fluid inlet includes a discharge port for discharging the mixture of first and second materials into an upper portion of the separation chamber.

17. The apparatus as defined in claim 14, wherein the first material storage chamber has a substantially cylindrical configuration, and the separation chamber has a substantially frustoconical configuration.

18. The apparatus as defined in claim 14, further comprising:

aeration means for inputting a selected gas to the first material storage chamber; and a plurality of coalescing plates each positioned within the separation chamber.

19. The apparatus as defined in claim 14, further comprising:

another separation tank including a third material storage chamber and another separation chamber spaced above the third material storage chamber, the another separation chamber having a horizontal cross-sectional area which continually decreases with increased spacing from the third material storage chamber;

another fluid inlet to the another separation tank;

a fourth material leg flow line spaced above the another separation chamber, the fourth material leg flow line having a fourth material inlet adjoining the another separation chamber and a fourth material outlet above the fourth material inlet;

a fourth material overflow weir adjoining the fourth material outlet;

a third material leg flow line spaced in parallel with the another separation tank, the third material leg flow line having a third material inlet in fluid communication with the third material storage chamber and a third material outlet spaced vertically between the another separation and the fourth material outlet;

a third material overflow weir adjoining the third material outlet;

a transfer flow line between the first material outlet and the another fluid inlet to the another separation tank; and at least one of the third material overflow weir and fourth material overflow weir being adjustable for selectively varying the elevation of the respective outlet with respect to the another separation tank and thereby the head pressure of the material within the respective flow line.

20. The apparatus as defined in claim 19, wherein the first material and third material are each substantially water, and the second material and fourth material are each substantially oil;

a treating flow line having a fluid inlet from the third material storage chamber and a fluid outlet to another separation chamber; and heating means for heating the fluid while passing through the treating flow line.

* * * * *